Patented Feb. 19, 1935

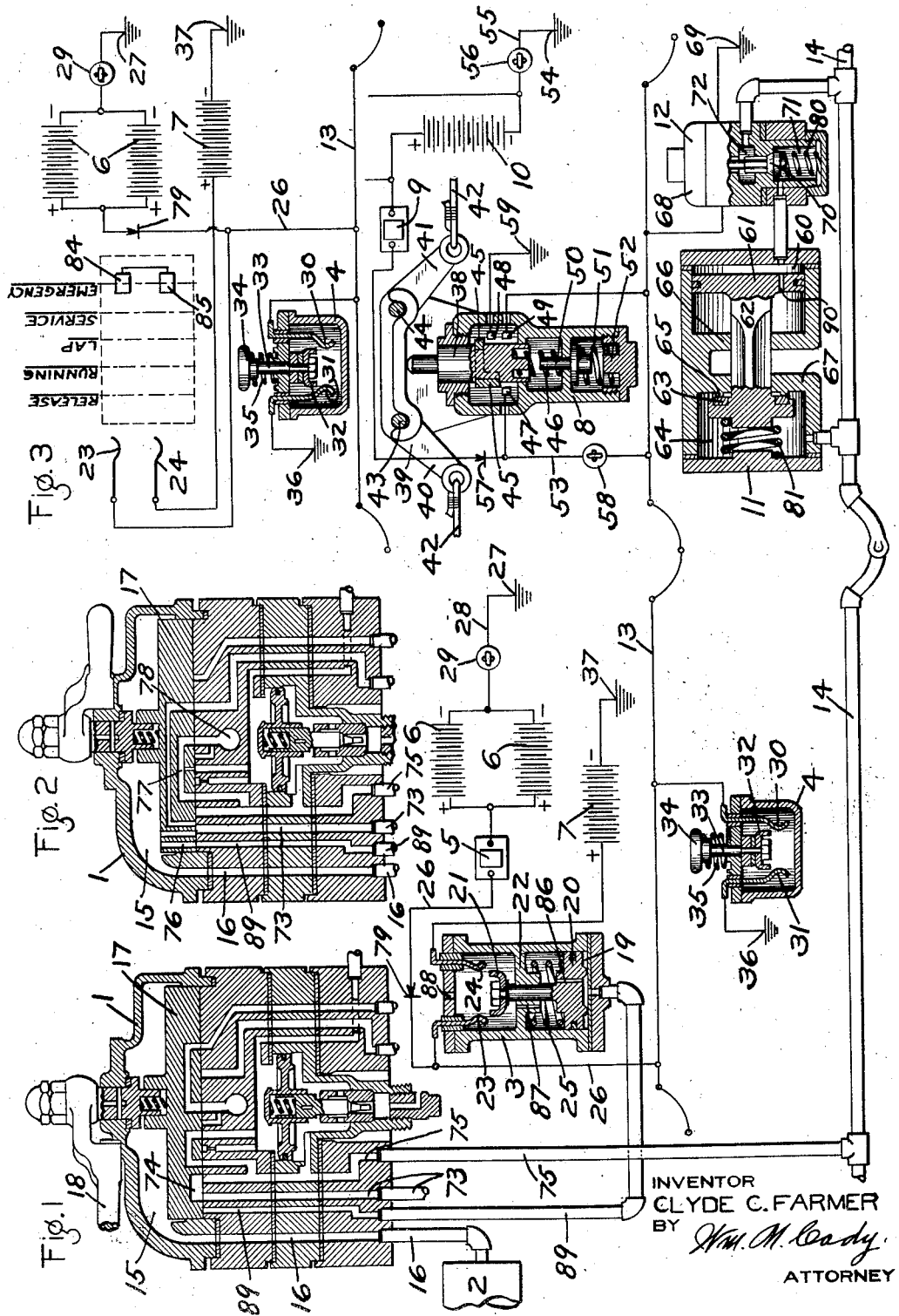

1,991,890

UNITED STATES PATENT OFFICE 1,991,890

COMBINED FLUID PRESSURE BRAKE AND SIGNAL SYSTEM

Clyde C. Farmer, Pittsburgh, Pa., assignor to The Westinghouse Air Brake Company, Wilmerding, Pa., a corporation of Pennsylvania Application May 27, 1929, Serial No. 366,121

3 Claims. (Cl. 303—20)

This invention relates to the fluid pressure brake and signal systems for railway trains, and has for its principal object to provide a combined fluid pressure brake and signal system which is controlled electrically.

Another object of my invention is to provide a combined fluid pressure brake and electric signal system which is operative for transmitting and receiving trainmen's signals and also operative for locally venting fluid under pressure from the brake pipe to the atmosphere when the brake valve device is operated to effect an application of the brakes.

Other objects and advantages will appear in the following more detailed description of the invention.

In the accompanying drawing, Figure 1 is a diagrammatic view mainly in section, of a combined fluid pressure brake and signal system embodying the invention, the brake valve device being shown in running position; Fig. 2 is a diagrammatic sectional view of the brake valve device in emergency position; and Fig. 3 is a diagrammatic view of a modification of the locomotive equipment.

As shown in Fig. 1 of the accompanying drawing, the combined brake and signal system for the locomotive of a train may comprise a brake valve device 1, a main reservoir 2, a pneumatically operative emergency switch device 3, a signal switch device 4, an engineman's signal indicating device 5 and electric current supply sources 6 and 7.

The equipment on each of the cars of the train may comprise a trainman's switch device 8, a signal indicating device 9, an electric current supply source 10, a brake pipe vent valve device 11 and a magnet valve device 12.

Extending continuously throughout the length of the train is a single train wire 13 and also the usual brake pipe 14, said train wire and brake pipe being connected between the vehicles in the usual manner.

The brake valve device 1 may comprise a casing having a chamber 15 connected to the main reservoir 2 through a pipe and passage 16 and contains a rotary valve 17 which is adapted to be operated by a handle 18.

The emergency switch device 3 may comprise a casing having a chamber 19 containing a piston 20 having a stem which extends through and is slidably guided in a wall 22 of the casing. Secured to the upper end of the stem is a connector 21, which is adapted to engage with switch contact terminals 23 and 24, mounted in insulators secured to the casing. Interposed between and engaging the piston 20 and wall 22 is a spring 25.

The signal indicating device 5 may be of the buzzer type having one of its terminals connected to the train wire 13 by a wire 26 and its other terminal connected to the positive terminal of the electric current supply source 6 which source may be in the form of batteries. The negative terminal of the supply source is connected to ground at 27 by a wire 28, there being a switch device 29 interposed in the wire.

The engineman's switch device 4 may comprise a casing having contact terminals 30 and 31 mounted therein which are adapted to be engaged by a connector 32 secured to a plunger 33 which is adapted to be operated in one direction through the medium of a foot button 34 and in the opposite direction by the pressure of a spring 35 interposed between the foot button and the casing. The contact terminal 30 is connected to the train wire 13 and the terminal 31 is connected to ground at 36.

The electric current supply source 7 may be in the form of a battery, the current from which has a higher potential than the current supplied from the source 6 and has its negative terminal connected to ground at 37 and its positive terminal connected to the contact terminal 24 of the emergency switch device 3. The contact terminal 23 of this switch device is connected to the wire 26.

The trainman's switch device 8 on each car may comprise a casing which contains a sliding contact member 38 adapted to be operated by a lever 39 having operating arms 40 and 41, each having an operating cord 42 connected thereto. Mounted on the casing are fulcrum pins 43 and 44, which are so disposed that when the arm 40 is operated, the lever 39 turns about the fulcrum pin 43 to operate the member 38 and when the arm 41 is operated the lever turns about the fulcrum pin 44 to operate said member.

The contact member 38 is provided with a contact 45 and is normally maintained in the position shown in Fig. 1 by the pressure of a spring 46. Arranged within the casing are contact terminals 47, 48 and 49, the contact 45 being adapted, at one time, to connect the contact terminals 47 and 48, and at another time, to connect the contact terminals 47 and 49. When the member 38 is moved downwardly from its normal position to the position in which the contact 45 engages the contact terminals 47 and 48, the lower end of the member engages the upper end of a stop 50 slidably mounted in the casing and subject to the pressure of a spring 51. Further downward movement of the member 38 is now resisted by the pressure of the spring 51 and when the contact 45 connects the contact terminals 47 and 49, the stop 50 will come to rest against a stop 52 rigid with the casing.

The signal indicating device 9 may be of the buzzer type having one of its terminals connected to the train wire 13 by a wire 53, and its other terminal connected to the positive terminal of the electric current supply source 10 which may be in the form of a battery. The negative terminal of this source is connected to ground at 54 by a wire 55 in which wire there is interposed a switch device 56.

The contact terminal 47 of the switch device 8 is connected to the wire 53 between a rectifier 57 and a switch 58 interposed in the wire 53. The contact terminal 48 is connected to the ground at 59 and the contact terminal 49 is connected to the train wire 13.

The vent valve device 11 may comprise a casing having a chamber 60, containing a piston 61 having a fluted stem 62 which is provided with a valve 63 contained in a chamber 64 connected to the brake pipe 14, which valve is adapted to seal against a seat ring 65 formed in the casing. The fluted stem 62 extends through openings in spaced walls 66 and 67, the space between the walls being open to the atmosphere.

The magnet valve device 12 comprises a magnet 68, having one of its terminals connected to the train wire 13 and its other terminal connected to ground at 69, and also comprises a valve 70 contained in a chamber 71 which is connected to the piston chamber 60 in the vent valve device 11. The valve 70 is operative to control communication from a chamber 72 to the chamber 71, said chamber 72 being connected to the brake pipe 14.

With the brake valve device 1 in running position, as shown in Fig. 1, the brake pipe 14 is supplied with fluid under pressure from the usual feed valve device (not shown) through a pipe and passage 73, a cavity 74 in the rotary valve 17 of the brake valve device and a passage and pipe 75. Fluid thus supplied to the brake pipe 14 flows to the valve chamber 64 in the vent valve device 11 and to the chamber 72 in the magnet valve device 12.

Assuming the switch devices 29, 56 and 58 to be in their closed positions, and the engineman desires to signal the trainman, the engineman depresses the foot button 34 of the switch device 4 a sufficient distance that the connector 32 connects the contact terminals 30 and 31, thus grounding the train wire 13 so that current from the electric supply source 10 will flow through the signal indicating device 9 and cause said device to operate to sound the signal initiated by the engineman. The signal device 5 on the locomotive will also operate since the current from the electric supply source 6 will flow to the train wire 13 and from thence through the switch device 4 to ground 36.

Should the trainman desire to signal the engineman, the trainman operates the lever 39 of the switch device 8 to move the contact 45 into connecting engagement with the contact terminals 47 and 48, thus closing the circuit through the engineman's signal device 5 and also the signal device 9, so that both devices will operate to sound the signal initiated by the trainman.

Should the switch device 58 be in its open position and the trainman desires to receive a signal from the engineman, the trainman operates the switch device 8 so that the contact 45 connects the contact terminals 47 and 49, so that, when the engineman operates the switch device 4 to connect the train wire 13 to ground 36, the circuit through the signal device 9 will be completed as will the circuit through the signal device 5 and both signals will operate to sound the signal from the engineman.

When the brake valve device 1 is operated to emergency position, as shown in Fig. 2, fluid under pressure from the main reservoir 2 is supplied to the piston chamber 19 of the emergency switch device 3 through pipe and passage 16, chamber 15, a port 76 in the rotary valve 17 of the brake valve device and passage and pipe 89. With the brake valve device in this position, the brake pipe 14 is vented to the atmosphere in the usual manner through pipe and passage 75, a cavity 77 in the rotary valve 17 and a passage 78.

Fluid under pressure supplied to the chamber 19 causes the emergency switch piston 20 to move upwardly against the pressure of the spring 25, carrying the connector 21 into contact with the contact terminals 23 and 24, thus closing the circuit through the electric current supply source, magnet 68 of the magnet valve device 12 and ground. With the circuit thus closed, current flows from the positive terminal of the electric current supply source 7 to the train wire 13 and then over said train wire and through the magnet 68 to ground. Current flowing in this direction is prevented from flowing to the signal device 5 and the current supply source 6 by a rectifier 79 interposed in the circuit wire 26 and is prevented from flowing to the signal device 9 and current supply source 10 by the rectifier 57 interposed in the wire 53 thus effectively guarding the current supply sources 6 and 10 against damage by the current supplied by the current supply source 7 of higher potential.

With the circuit thus closed, the magnet 68 is energized causing the valve 70 of the magnet valve device 12 to be unseated against the pressure of a spring 80 contained in the valve chamber 71, thus establishing communication through which fluid under pressure in the chamber 72 and supplied from the brake pipe 14 flows to the valve chamber 71 and from thence to the piston chamber 60 in the vent valve device 11.

The pressure of fluid thus supplied to the chamber 60 causes the vent valve piston 61 to move toward the left against the pressure of a spring 81 contained in the valve chamber 64, unseating the vent valve 63 from the seat ring 65. With the valve 63 unseated, fluid under pressure from the brake pipe 14 is released to the atmosphere by way of valve chamber 64, past the unseated valve 63 and around the fluted stem 62. When each car of a train is provided with a magnet valve device 12 and a vent valve device 11, these devices throughout the length of the train, will operate simultaneously and thus cause all of the usual triple valve devices (not shown) to operate to emergency positions to effect an emergency application of the brakes. When the rear car, only, of a train is provided with a magnet valve device 12 and a vent valve device 11, fluid under pressure will be vented from the brake pipe at the rear end of the train at the same time as the brake pipe is vented at the front end of the train through the brake valve device, thus causing all of the triple valve devices on the train to operate promptly to emergency positions to effect an emergency application of the brakes.

In the present embodiment of the invention there are no means in the brake valve device for venting the piston chamber 19 in the emergency switch device when the brake valve device 1 is in release or running position, but this chamber is vented to the atmosphere through a port 86 through the piston 20, a passage 87 through the wall 22 of the casing and an atmospheric passage 88.

When the brake valve device 1 is operated to release position to release the brakes after an emergency application, and the piston chamber 19 of the emergency switch device 3 vented to the atmosphere as just described, the pressure of the spring 25 moves the piston 20 to its lowermost position, causing the connector 21 to be moved out of contact with the contact terminals 23 and 24, thus opening the circuit through the magnet 68 of the magnet valve device 12, thus deenergizing said magnet. When the magnet 68 is thus deenergized, the pressure of the spring 80 causes the valve 70 to seat and close off the further supply of fluid under pressure from the brake pipe to the chamber 60 in the vent valve device 11, when said brake pipe is being recharged.

When the brake pipe 14 is completely vented the pressure of the spring 81 in the vent valve device causes the valve 63 to seal against the seat ring 65, closing communication from the brake pipe to the atmosphere through the vent valve device. If at any time there is fluid under pressure in the piston chamber 60 in the vent valve device when the valve 70 of the magnet valve device 12 is seated it will be discharged to the atmosphere through a port 90 through the piston 61 and around the fluted stem 62.

It will here be understood that the resistance of the magnet 68 is such that when the equipment is in the condition shown in Fig. 1 of the drawing, the current flow from the batteries 6 and 10 through the signal indicating devices 5 and 9 respectively to the ground 69 through the magnet is insufficient to either cause the signal devices to operate or the magnet to be energized.

In Figure 3 of the drawing, a modification of the engine equipment is illustrated, which differs from the locomotive equipment illustrated in Fig. 1, in that the fluid pressure operated emergency switch device 3 is omitted and the switch contact terminals 23 and 24 are so arranged that when the brake valve device 1 is operated to emergency position, the magnet circuit is closed by the connected contacts 84 and 85 engaging the terminals 23 and 24.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a brake system, the combination with a fluid pressure brake equipment comprising a brake pipe normally charged with fluid under pressure and a brake valve device operable manually for controlling the application and release of the brakes, of a valve device operable by fluid under pressure for venting fluid under pressure from the brake pipe to effect an application of the brakes, a magnet valve device operable to establish a communication through which fluid under pressure is adapted to flow to said valve device to cause the valve device to operate to vent fluid under pressure from the brake pipe, a train wire, said magnet valve device comprising a normally seated valve and a winding wire for controlling the operation of the valve, a source of direct current at all times connected in circuit with the train wire for at times supplying current to operate a signal device, the current flow from said source of current being insufficient to effectively energize said winding, a second source of direct current normally cut out of circuit with the train wire, and means operative upon movement of the brake valve device to a brake applying position for connecting the second source of current in circuit with the train wire and winding, said winding when the second source of current is connected in circuit therewith being effectively energized to cause said valve to be unseated to permit the flow of fluid under pressure to effect the operation of said valve device.

2. In a brake system, the combination with a fluid pressure brake equipment comprising a brake pipe normally charged with fluid under pressure and a brake valve device operable manually for controlling the application and release of the brakes, of a valve device operable by fluid under pressure for venting fluid under pressure from the brake pipe to effect an application of the brakes, a magnet valve device operable to establish a communication through which fluid under pressure is adapted to flow to said valve device to cause the valve device to operate to vent fluid under pressure from the brake pipe, a train wire, said magnet valve device comprising a normally seated valve and a winding at all times connected in circuit with the train wire for controlling the operation of the valve, a source of direct current at all times connected in circuit with the train wire for at times supplying current to a signal device, the current flow from said source of current being insufficient to effectively energize said winding, a second source of direct current normally cut out of circuit with the train wire, and switch means operable by fluid under pressure supplied by said brake valve device upon movement of the brake valve device to emergency application position for connecting the second source of current in circuit with the train wire and winding, said winding, when the second source of current is connected in circuit therewith, being effectively energized to cause said valve to be unseated to permit the flow of fluid under pressure to effect the operation of said valve device.

3. In a brake system, the combination with a fluid pressure brake equipment comprising a brake pipe normally charged with fluid under pressure, of a valve device operable by fluid under pressure for venting fluid under pressure from the brake pipe to effect an application of the brakes, a magnet valve device operable to establish a communication through which fluid under pressure is adapted to flow to said valve device to cause the valve device to operate to vent fluid under pressure from the brake pipe, a train wire, said magnet valve device comprising a normally seated valve and a winding at all times connected in circuit with the train wire for controlling the operation of the valve, a source of direct current at all times connected in circuit with the train wire for supplying current to a signal circuit, the current flow from said source of current being insufficient to effectively energize said winding, a second source of direct current normally cut out of circuit with the train wire, switch means operable by fluid under pressure supplied by the brake valve device upon movement of the brake valve device at all times connected in circuit with the train to emergency application position for connecting the second source of current in circuit with the train wire and winding, said winding, when the second source of current is connected in circuit therewith, being effectively energized to cause said valve to be unseated to permit the flow of fluid under pressure to effect the operation of said valve device, and means operable for only at times supplying fluid under pressure to effect the operation of said switch means.

CLYDE C. FARMER.